(12) United States Patent
Hwang et al.

(10) Patent No.: US 9,258,130 B2
(45) Date of Patent: Feb. 9, 2016

(54) APPARATUS AND METHOD FOR ANONYMITY-BASED AUTHENTICATION AND KEY AGREEMENT CAPABLE OF PROVIDING COMMUNICATION MESSAGE BINDING PROPERTY

(71) Applicant: Electronics and Telecommunications Research Institute, Daejeon (KR)

(72) Inventors: Jung-Yeon Hwang, Daejeon (KR); Ku-Young Chang, Daejeon (KR); Pil-Joong Lee, Gyeongsangbuk-do (KR); Sung-Wook Eom, Gyeongsangbuk-do (KR); Dae-Hun Nyang, Incheon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 73 days.

(21) Appl. No.: 13/947,693

(22) Filed: Jul. 22, 2013

(65) Prior Publication Data

US 2014/0173281 A1    Jun. 19, 2014

(30) Foreign Application Priority Data

Dec. 14, 2012    (KR) .................. 10-2012-0146909

(51) Int. Cl.
*H04L 9/08* (2006.01)
*H04L 9/32* (2006.01)
*H04L 9/00* (2006.01)

(52) U.S. Cl.
CPC ............... *H04L 9/3281* (2013.01); *H04L 9/08* (2013.01); *H04L 9/0844* (2013.01); *H04L 9/00* (2013.01); *H04L 9/32* (2013.01)

(58) Field of Classification Search
USPC ............... 713/171, 156, 168, 169; 380/28, 30
See application file for complete search history.

(56) References Cited

U.S. PATENT DOCUMENTS

| | | | |
|---|---|---|---|
| 2012/0023334 A1* | 1/2012 | Brickell et al. | ............... 713/169 |
| 2012/0072732 A1* | 3/2012 | Canard et al. | ................. 713/176 |

FOREIGN PATENT DOCUMENTS

| | | |
|---|---|---|
| KR | 1998-048479 | 9/1998 |
| KR | 10-2009-0089948 | 8/2009 |

OTHER PUBLICATIONS

Walker, Jesse et al., "Key Exchange with Anonymous Authentication Using DAA-SIGMA Protocol," Intrust 2010, LNCS 6802, pp. 108-127 (2011).

* cited by examiner

*Primary Examiner* — Brandon Hoffman
*Assistant Examiner* — Samuel Ambaye
(74) *Attorney, Agent, or Firm* — Nelson Mullins Riley & Scarborough LLP; Anthony A. Laurentano; Lewis Lee

(57) ABSTRACT

Disclosed herein are an apparatus and method for anonymity-based authentication and key agreement capable of providing a communication message binding property. The apparatus includes a signature verification unit and a binding checking unit. The signature verification unit receives a plurality of messages, each carrying a signature including link information of a sender, and verifies the signature of each of the plurality of messages. The binding checking unit, if it is determined by the signature verification unit that the signature is valid, determines whether the plurality of messages has been sent by an identical sender based on the link information of the signature.

9 Claims, 6 Drawing Sheets

APPARATUS AND METHOD FOR ANONYMITY-BASED AUTHENTICATION AND KEY AGREEMENT CAPABLE OF PROVIDING COMMUNICATION MESSAGE BINDING PROPERTY

CROSS REFERENCE TO RELATED APPLICATION

This application claims the benefit of Korean Patent Application No. 10-2012-0146909, filed on Dec. 14, 2012, which is hereby incorporated by reference in its entirety into this application.

BACKGROUND OF THE INVENTION

1. Technical Field

The present invention relates generally to an apparatus and method for anonymity-based authentication and key agreement capable of providing a communication message binding property and, more particularly, to an apparatus and method that are capable of ensuring that messages have been sent by the same user via an anonymity-based authenticated key agreement protocol.

2. Description of the Related Art

Since the concept of a key agreement protocol was first presented by Diffie and Hellman in 1976, various types of key agreement protocols have been actively researched in order to establish a secure communication channel.

In particular, in order to defend against a man-in-the-middle attack on an initial Diffie-Hellman scheme, research into the combination of various authentication methods with a key agreement protocol has become an important issue.

An authenticated key agreement protocol enables a common key between users to be computed while ensuring that participants are valid. The computed key can later be used for cryptographic purposes, such as data encryption, integrity, authentication, etc. In practice, key agreement protocols are used in Kerberos and Secure Socket Layer (SSL). Korean Patent Application Publication No. 1998-048479 discloses a digital signature method that is capable of ensuring the security of the design of a digital signature when the signature is generated and verified. In greater detail, Korean Patent Application Publication No. 1998-048479 discloses a digital signature method for digital signatures that are used to ensure the integrity and authentication of electronic documents, the method including a first step of generating a digital signature in such a way that a signer signs an electronic document with his or her own private key; and a second step of verifying the signature based on a signature message. The technology disclosed in Korean Patent Application Publication No. 1998-048479 can be securely used in an environment that provides information protection services, such as a digital signature, identification, message verification, etc. in an electronic document trading system. Meanwhile, Korean Patent No. 10-1020300 discloses an electronic signature method using bilinear mapping in which a private signature key and a public verification key are configured in specific forms using a generator P of an additive group for bilinear mapping, and the overall computational load is reduced through prior computation.

Most authenticated key agreement protocols that are currently known are disadvantageous and undesirable in terms of privacy protection because they are based on the real name authentication of participants. As a representative example, when the authentication of a key agreement protocol is performed using a Public Key Infrastructure (PKI)-based digital signature that is currently widely used, information about the real name of a signer may be divulged. Furthermore, it also has the problems of the divulgence of personal information in connection with an authentication service, divulgence attributable to the excessive gathering and careless management of personal information by a service provider, and the wide range tracking of activities.

Meanwhile, when a privacy problem must be addressed as an important factor, key agreement should be performed at an appropriate privacy level. As an example, an adult may perform anonymous authentication, instead of real name-based authentication, in order to view an adult movie online, download content using an agreed key, and then view it. As another example, an impaired person may perform anonymity-based authentication in order to view data, and then receives encrypted data using an agreed key.

In order to overcome the above problem, anonymous authentication-based key agreement protocols have been proposed. Basically, anonymous authentication-based key agreement protocols are based on authentication that provides anonymity, so that participants cannot be aware of the identity of other participants who participate in a corresponding protocol but the validity of users can be verified.

However, since such an anonymous authentication-based key agreement protocol is based on anonymity, participants who participate in the corresponding protocol cannot determine whether the same counterpart participant sends messages if the messages are sent via a plurality of rounds. For example, if a participant establishes a session through the performance of the key agreement protocol and subsequent performance and then turns over or hands over the current session to another user, a counterpart participant who established the session together with the former user cannot be aware of the activity. Since a user who pays fees and uses a service anonymously can turn over his service to another person, it would be undesirable to a service provider. As another example, when a session is hijacked by an attack, protocol participants cannot be aware of this attack if the attacker normally uses anonymity-based authentication. Therefore, in the anonymity-based authentication and key agreement protocols, it is necessary to ensure that messages have been sent by the same user. In related documents, this property is referred to as a full binding property.

Recently, Walker and Li proposed a method for providing a communication message binding property to an anonymity-based key agreement protocol. The main idea of this method is to provide a binding property using an agreed key. That is, whenever a message is sent, a hash value for the message is generated using an agreed key and the hash value is sent along with the message. However, when the agreed key is given to another user and a session is turned over to him or her, the above-described problem still occurs. Furthermore, when an illegitimate attacker steals the agreed key, the above-described problem still occurs.

SUMMARY OF THE INVENTION

Accordingly, the present invention has been made keeping in mind the above problems occurring in the conventional art, and an object of the present invention is to provide an apparatus and method for anonymity-based authentication and key agreement that is capable of providing a communication message binding property that ensures that messages that have been received via a plurality of rounds by participants who desire key agreement as well as anonymity have been sent by the same counterpart participants.

In accordance with an aspect of the present invention, there is provided a method for anonymity-based authentication and key agreement capable of providing a communication message binding property, the method including receiving, by a user device, a plurality of messages, each carrying a signature including link information of a sender; verifying, by the user device, the signature of each of the plurality of messages; and, if, as a result of the verification, it is determined that the signature is valid, determining, by the user device, whether the plurality of messages has been sent by an identical sender based on the link information of the signature.

The signature may be generated by using as input values a private key of the sender, a group public key of the sender, and the link information.

The link information may be based on a hash value that is computed by using as an input an commitment value that is obtained by raising a generator of an algebraic multiplicative group, an order of which is a prime number, to the power of a random number. This commitment value may be used for key agreement.

Determining whether the plurality of messages has been sent by the identical sender is performing the determination when the plurality of messages is two or more messages.

In accordance with another aspect of the present invention, there is provided a method for anonymity-based authentication and key agreement capable of providing a communication message binding property, the method including generating, by a first user device, a first signature based on a private key, group public key, link information, and first commitment value of the first user device, and sending, by the first user device, a first message, including the generated first signature together with the first commitment value, to a second user device; verifying, by the second user device, the first signature, and, if the first signature is valid, sending, by the second user device, a second message, including a second signature generated based on a private key, group public key, link information, and first hash value of the second user device, together with a second commitment value, to the first user device; verifying, by the first user device, the second signature, and, if the second signature is valid, sending, by the first user device, a third message, including a third signature generated based on the private key, group public key, and link information of the first user device and a second hash value of the first user device, to the second user device; and verifying, by the second user device, the third signature, and, if the third signature is valid, determining, by the second user device, whether the first and third messages have been sent by the first user device based on the link information of the first and third signatures.

The first and second commitment values may be each obtained by raising a generator of a group, an order of which is a prime number, to the power of a random number.

The link information of the first user device may be based on a hash value that is computed by using as an input the first commitment value that is obtained by raising a generator of a group, an order of which is a prime number, to the power of a first random number.

The link information of the second user device may be based on a hash value that is computed by using as an input the second commitment value that is obtained by raising a generator of a group, an order of which is a prime number, to the power of a second random number.

In accordance with still another aspect of the present invention, there is provided an apparatus for anonymity-based authentication and key agreement capable of providing a communication message binding property, the apparatus including a signature verification unit configured to receive a plurality of messages, each carrying a signature including link information of a sender, and to verify the signature of each of the plurality of messages; and a binding checking unit configured to, if it is determined by the signature verification unit that the signature is valid, determine whether the plurality of messages has been sent by an identical sender based on the link information of the signature.

The signature may be generated by using as input values a private key of the sender, a group public key of the sender, and the link information.

The link information may be based on a hash value that is computed by using as an input an commitment value that is obtained by raising a generator of an algebraic multiplicative group, an order of which is a prime number, to the power of a random number.

The binding checking unit may perform the determination when the plurality of messages is two or more messages.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
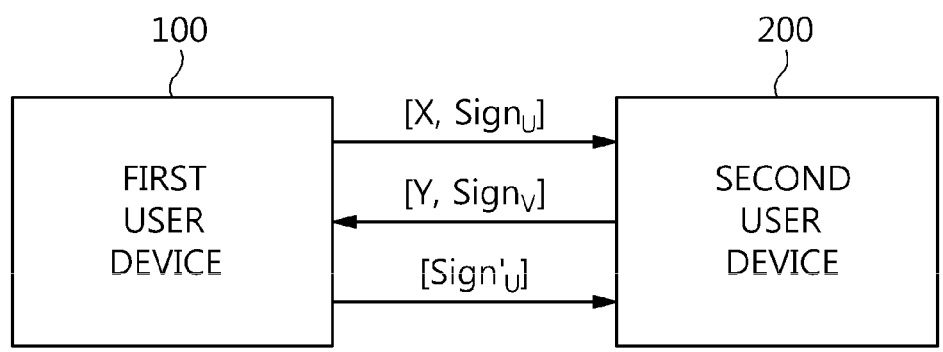
FIG. 1 is a diagram illustrating an apparatus for anonymity-based authentication and key agreement capable of providing a communication message binding property according to an embodiment of the present invention.

The present invention is characterized in that each protocol participant generates a privacy-protecting digital signature value providing anonymity and linkability for each message and then sends them together in order to perform a key agreement scheme and in that each user who has received a message gathers the signature value of a previously received message and a signature value included in a current message, checks linkability and then verifies whether the message senders thereof are the same.

An apparatus and method for anonymity-based authentication and key agreement capable of providing a communication message binding property according to embodiments of the present invention will be described with reference to the accompanying drawings below. Prior to the detailed description of the present invention, it should be noted that the terms and words used in the specification and the claims should not be construed as being limited to ordinary meanings or dictionary definitions. Meanwhile, the embodiments described in the specification and the configurations illustrated in the drawings are merely examples and do not exhaustively present the technical spirit of the present invention. Accordingly, it should be appreciated that there may be various equivalents and modifications that can replace the examples at the time at which the present application is filed.

FIG. 1 is a diagram illustrating an apparatus for anonymity-based authentication and key agreement capable of providing a communication message binding property according to an embodiment of the present invention.

A first user device 100 and a second user device 200 are user devices that execute an anonymous authentication-based key agreement protocol. The first and second user devices 100 and 200 may be service providers or service consumers. Each of the first and second user devices 100 and 200 may be used as an algorithm that outputs a particular value with respect to a given input value.

The first and second user devices 100 and 200 that participate in anonymity-based authentication and anonymous authentication-based key agreement protocols are not limited thereto, the roles of participants (that is, the user devices 100 and 200) may be flexibly split or incorporated depending on the design method. If necessary, a new participant may be defined.

It is assumed that the first and second user devices 100 and 200 obtain private keys (also called signature keys) to be used for anonymity-based authentication before first executing an anonymous authentication-based key agreement protocol. A group signature scheme that provides anonymity and a binding property and a privacy protection-type digital signature, such as Direct Anonymous Attestation (DAA), may be used as digital signatures that are used for anonymity-based authentication. In the following description, it is assumed that a digital signature scheme that is used for anonymity-based authentication consists of Setup, Join, Sign, Vrfy, and Link algorithms.

The first and second user devices 100 and 200 use Setup, Join, Sign, Vrfy, and Link algorithms. Setup generates parameters (for example, including a group public key gpk) that are required for a digital signature scheme (for example, a DAA scheme) that is used for anonymity-based authentication, and users obtain private keys sk through Join. Sign generates a signature value using a private key, a message, and a linkbase. Optionally, Sign may internally generate the linkbase in accordance with a signer's intention. Vrfy determines the validity of a signature. Link determines whether two given signature values have been generated by the same signer. If signatures are generated using arbitrary linkbases during the generation of the signatures, the signatures cannot be linked to each other.

In an embodiment of the present invention, various key agreement protocols may be used. It may be assumed that the first and second user devices 100 and 200 of FIG. 1 employ the Diffie-Hellman key agreement protocol. Furthermore, it is assumed that parameters G, q, and g that are required to describe the Diffie-Hellman key agreement protocol are defined in advance. Here, G is an algebraic multiplicative group whose order is a prime number q, and g is a generator of a group G. Hereinafter, for simplicity of description, Zq is defined as set $\{0, 1, \ldots, q-1\}$.

In the following description of the embodiments of the present invention, a hash function $H:\{0,1\}^* \rightarrow \{0,1\}^L$ having cryptographic robustness is used. A hash function is a function that converts a bit string into a fixed L-bit string. Here, it is assumed that the hash function value of a signature scheme (for example, DAA) that is used for anonymity-based authentication is the same form as that of a linkbase. Furthermore, it is assumed that a Pseudo-Random Function (PRF) is used in this embodiment of the present invention.

It will be apparent that when the user devices 100 and 200 generate privacy-protecting digital signatures, the user devices 100 and 200 may add various input values in order to provide additional security features, if necessary. Furthermore, the user devices 100 and 200 may utilize various privacy-protecting digital signature schemes in order to achieve various security purposes. For example, a DAA signature scheme that provides only linkability, a ring signature scheme that provides full signer anonymity, and a group signature scheme that provides controllable anonymity, or privacy-protecting signature schemes with controllable anonymity and linkability may be used. In some cases, a mixture of various digital signature schemes, including a proxy signature scheme that can delegate signature capability, may be used.

Figure 2:
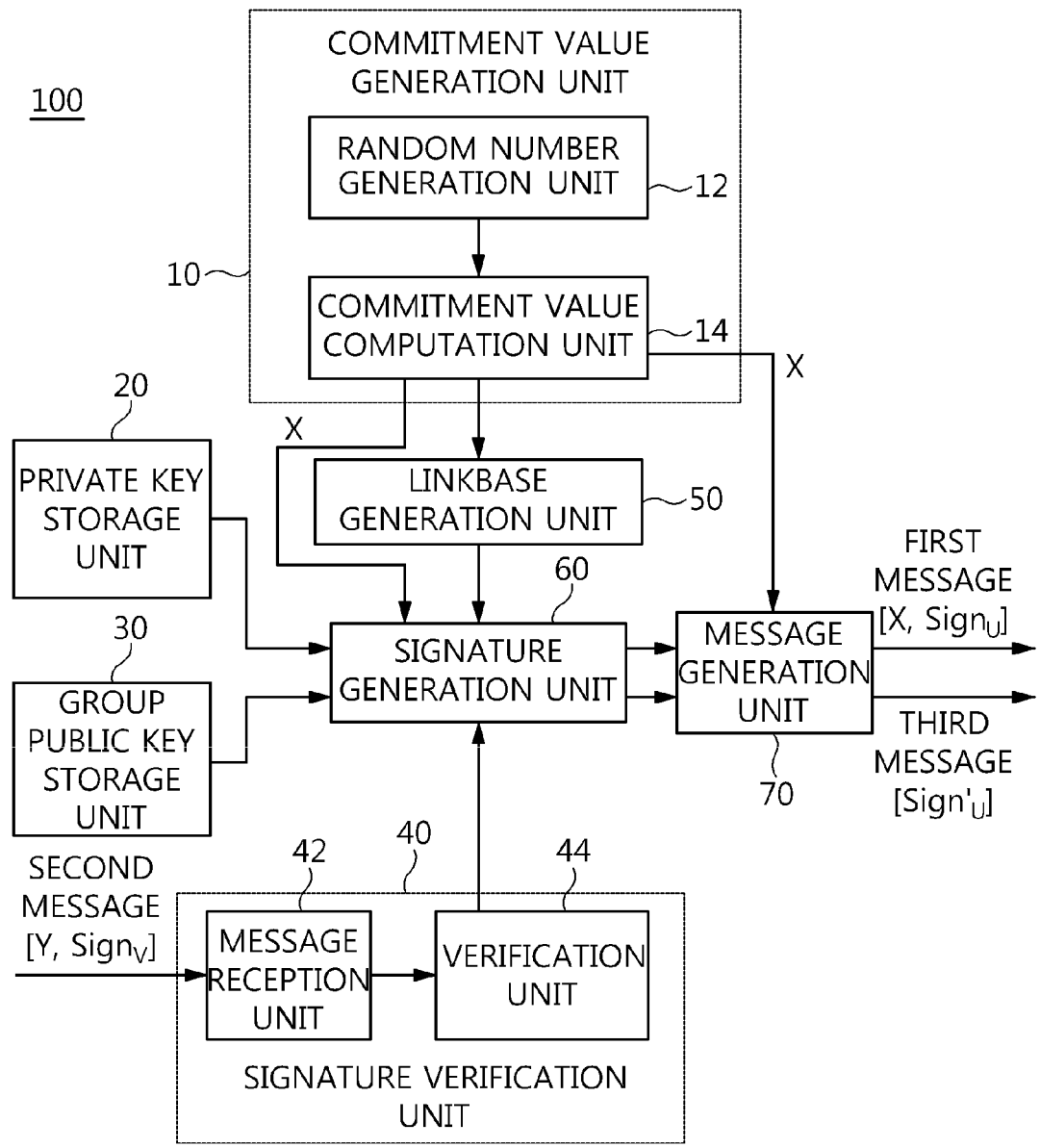
FIG. 2 is a diagram illustrating the internal configuration of the first user device illustrated in FIG. 1.

FIG. 2 is a diagram illustrating the internal configuration of the first user device illustrated in FIG. 1.

The first user device 100 includes an commitment value generation unit 10, a private key storage unit 20, a group public key storage unit 30, a signature verification unit 40, a linkbase generation unit 50, a signature generation unit 60, and a message generation unit 70.

The commitment value generation unit 10 generates a first commitment value X (or a temporary Diffie-Hellman public key) that is required when the first user device 100 generates a key agreement and a signature. The commitment value generation unit 10 includes a random number generation unit 12 configured to generate a random number, and an commitment value computation unit 14 configured to compute a first commitment value X ($X=g^x$) by raising a generator g of an algebraic multiplicative group G, the order of which is a prime number q, to the power of an arbitrary random number x ($x \in Zq$) in the random number generation unit 12.

The private key storage unit 20 stores a private key $sk_u$ that is required when the first user device 100 generates a signature.

The group public key storage unit 30 stores a group public key gpk that is required when the first user device 100 generates a signature.

Although the embodiment of the present invention has been described as including the private key storage unit 20 and the group public key storage unit 30, it may be possible to receive the private key $sk_u$ from a user, rather than to store the private key $sk_u$, and it may be possible to receive the group public key gpk from a separate key issuing server (not illustrated), rather than to store the group public key gpk.

The signature verification unit 40 receives a second message [Y, $Sign_V$] from the second user device 200, and verifies a signature included in the second message. The signature verification unit 40 includes a message reception unit 42 configured to receive a second message, that is, a second message [Y, $Sign_V$] including a signature generated based on the link information of the second user device 200, from the corresponding second user device 200, and a verification unit 44 configured to verify the signature included in the second message. The signature verification unit 40 receives the second message [Y, $Sign_V$] from the second user device 200, computes $K=Y^x=g^{xy}$, $k_0=PRF_K(0)$, $k_1=PRF_K(1)$, a hash value $h_V=H(Y,X,k_0)$, and a linkbase $bsn_V$, and determines whether the equality 1=Vrfy(gpk, $bsn_V$, $h_V$, $Sign_V$) is satisfied, thereby determining the validity of the corresponding signature.

The linkbase generation unit 50 generates a linkbase $bsn_U$ that is required when the first user device 100 generates a signature. The linkbase generation unit 50 receives the first commitment value X from the commitment value computation unit 14, computes a hash value, and uses the computed hash value as the linkbase $bsn_U$ of the signature. Here, the linkbase generation unit 50 may receive a value predetermined in connection with a protocol or the like (from a user or the like) in addition to the first commitment value X.

The signature generation unit 60 receives its own private key $sk_U$ stored in the private key storage unit 20, the group public key gpk stored in the group public key storage unit 30, and the first commitment value X and the linkbase $bsn_U$ provided by the commitment value generation unit 10 and the linkbase generation unit 80, respectively, and generates a first signature $Sign_U$ ($Sign_U$=Sign($sk_U$, gpk, $bsn_U$, X)).

Furthermore, the signature generation unit 60 generates a second signature $Sign_U$ ($Sign_U$=Sign($sk_U$, gpk, $bsn_U$, $h_U$)) using its own private key $sk_U$ stored in the private key storage unit 20, the group public key gpk stored in the group public key storage unit 30, the linkbase $bsn_U$, and a hash value $h_U$. Here, $K=Y^x=g^{xy}$, $k_0=PRF_K(0)$, $h_U=H(X,Y,k_0)$, and K is computed using the second commitment value Y included in the second message [Y, $Sign_V$] and the random number x generated in the random number generation unit 12.

When the message generation unit 70 receives the first signature $Sign_U$ from the signature generation unit 60, it generates the first message [X, $Sign_U$] including the first commitment value X of the commitment value computation unit 14 and its first signature $Sign_U$, and sends the first message [X, $Sign_U$] to the second user device 200. Here, the first commitment value X is the commitment value or a temporary Diffie-Hellman public key for the Diffie-Hellman key agreement protocol. Only when the first user device 100 generates the first commitment value X and a signature related to the first commitment value X and sends them to a counterpart, that is, the second user device 200, can the second user device 200 compute a key. In the same manner, the second user device 200 should generate the second commitment value Y and a signature related to the second commitment value Y, and send them to the first user device 100.

Furthermore, when the message generation unit 70 receives the second signature $Sign_U$ from the signature generation unit 60, it generates a third message [$Sign'_U$] including the second signature $Sign'_U$ and sends it to the second user device 200.

If the signature included in the second message [Y, $Sign_V$] is valid, the first user device 100 uses $k_1=PRF_K(1)$ as an agreed session key.

In the embodiment of the present invention, the first user device 100 sends the first message [X, $Sign_U$] to the second user device 200, the second user device 200 sends the second message [Y, $Sign_V$] to the first user device 100, and accordingly the first user device 100 sends the third message [$Sign'_U$] to the second user device 200.

Figure 3:
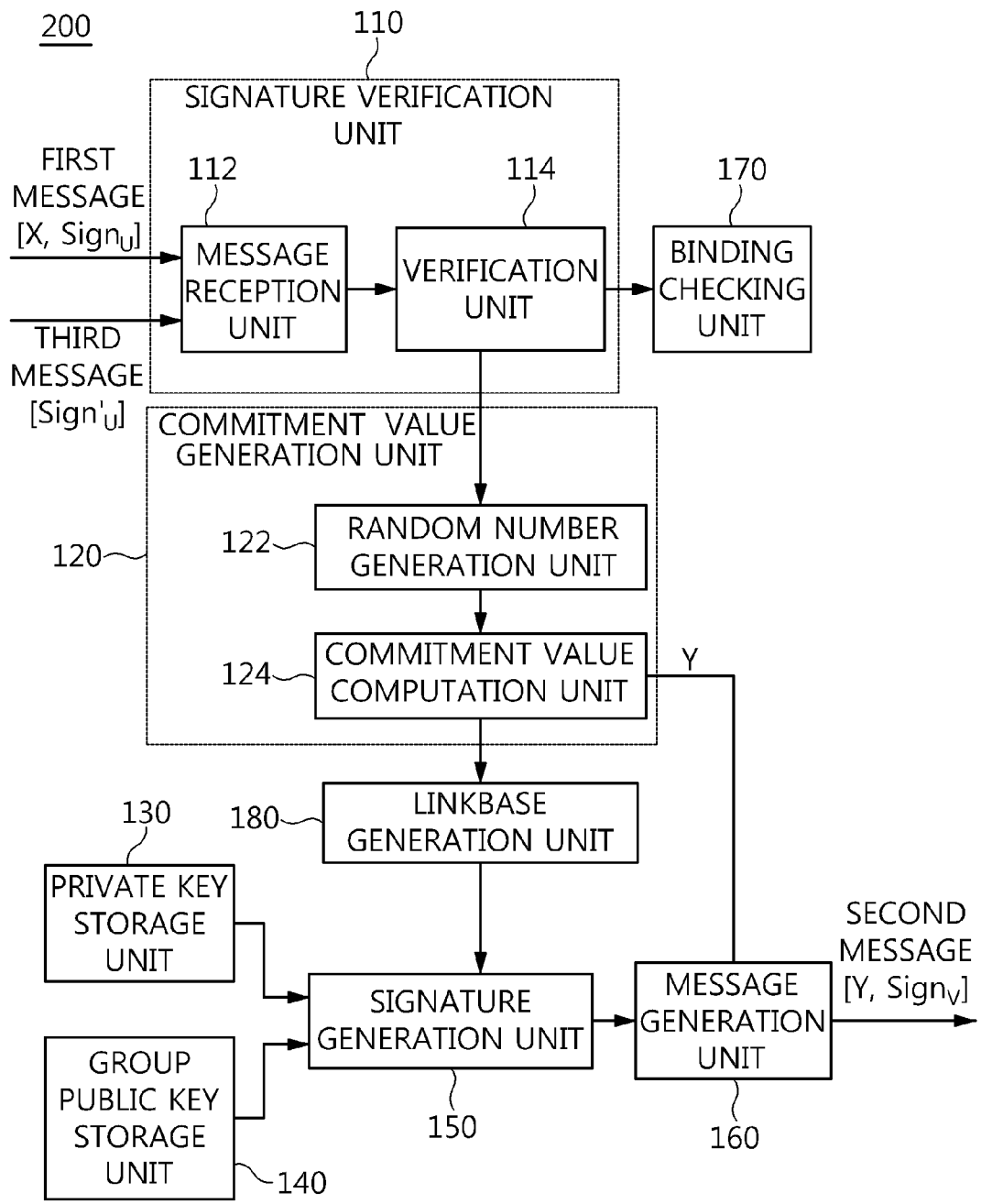
FIG. 3 is a diagram illustrating the internal configuration of the second user device illustrated in FIG. 1.

FIG. 3 is a diagram illustrating the internal configuration of the second user device illustrated in FIG. 1.

The second user device 200 includes a signature verification unit 110, an commitment value generation unit 120, a private key storage unit 130, a group public key storage unit 140, a signature generation unit 150, a message generation unit 160, a binding checking unit 170, and a linkbase generation unit 180.

The signature verification unit 110 receives the first message [X, $Sign_U$] and the third message [$Sign'_U$] from the first user device 100, and verifies the signatures included in the messages. The signature verification unit 110 includes a message reception unit 112 configured to sequentially receive the first message [X, $Sign_U$] and the third message [$Sign'_U$] from the first user device 100, and a verification unit 114 configured to verify the first signature included in the first message [X, $Sign_U$] and the second signature included in the third message [$Sign'_U$]. Here, when the signature verification unit 110 receives the first message from the first user device 100, it computes the linkbase $bsn_U$ of the first message and determines whether the equality 1=Vrfy(gpk, $bsn_U$, X, $Sign_U$) is satisfied, thereby determining the validity of the first signature. Furthermore, when the signature verification unit 110 receives the third message from the first user device 100, it computes the linkbase $bsn_U$ of the third message and a hash value $h_U$ and determines whether the equality 1=Vrfy(gpk, $bsn_U$, $h_U$, $Sign'_U$) is satisfied, thereby determining the validity of the second signature.

The commitment value generation unit 120 generates the second commitment value Y (or a temporary Diffie-Hellman public key) that is required when the corresponding second user device 200 generates a key agreement and a signature. The commitment value generation unit 120 includes a random number generation unit 122 configured to generate a random number, and an commitment value computation unit 124 configured to compute the second commitment value Y ($Y=g^y$) by raising the generator g of an algebraic multiplicative group G, the order of which is a prime number q, to the power of an arbitrary random number y ($y \in Z_q$) in the random number generation unit 122.

The private key storage unit 130 stores the private key $sk_V$ that is required when the second user device 200 generates the signature $Sign_V$.

The group public key storage unit 140 stores the group public key gpk that is required when the second user device 200 generates a signature $Sign_V$.

Although this embodiment of the present invention has been described as including the private key storage unit 130 and the group public key storage unit 140, it may be possible to receive the private key $sk_V$ from a user, rather than to store the private key $sk_V$, and it may be possible to receive the group public key gpk from a separate key issuance server (not illustrated), rather than to store the group public key gpk.

As it is determined by the signature verification unit 110 that the signature of the first message of the first user device 100 is valid, the signature generation unit 150 computes $K=X^y=g^{xy}$, $k_0=PRF_K(0)$, and $k_1=PRF_K(1)$, and then computes a hash value $h_V$ ($h_V=H(Y,X,k_0)$). Furthermore, the signature generation unit 150 generates a signature $Sign_V$=Sign($sk_v$, gpk, $bsn_V$, $h_V$) using the hash value $h_V$, its own private key $sk_V$ stored in the private key storage unit 130, the group public key gpk stored in the group public key storage unit 140, and the linkbase $bsn_V$ taken over from the linkbase generation unit 180.

When the message generation unit 160 receives the signature $Sign_V$=Sign($sk_v$, gpk, $bsn_V$, $h_V$) from the signature generation unit 150, it generates a second message [Y, $Sign_V$] including the second commitment value Y of the commitment value computation unit 124 and its signature $Sign_V$, and sends it to the first user device 100. Here, the second commitment value Y is an commitment value or a temporary Diffie-Hellman public key for the Diffie-Hellman key agreement protocol. Only when the second user device 200 generates the second commitment value Y and a signature related to the second commitment value Y and sends them to a counterpart, that is, the first user device 100, can the first user device 100 compute a common key using them. In the same manner, the first user device 100 should generate the first commitment value X and a signature related to the first commitment value X, and send them to the second user device 200.

If it is verified by the signature verification unit 110 that the first signature of the first message and the second signature of the third message are all valid, the binding checking unit 170 determines whether the first and third messages from the first user device 100 have been sent by the same sender based on the linkbase of the first signature and the linkbase of the second signature. That is, if the signature verification unit 110 determines that the first signature of the first message and the second signature of the third message are all valid, the binding checking unit 170 checks whether the equality 1=Link (Sign$_U$, Sign'$_U$) is satisfied, thereby checking the linkability. In other words, the binding checking unit 170 checks the linkability of the first and second signatures using the linkbases included in the first and second signatures. For example, if the linkbase of the first signature is the same as that of the second signature, it is determined that the first and second signatures have the linkability.

The linkbase generation unit 180 generates the linkbase bsn$_V$ that is required when the corresponding second user device 200 generates the signature Sign$_V$. The linkbase generation unit 12 receives the second commitment value Y from the commitment value computation unit 124, computes a hash value, and uses the computed hash value as the linkbase bsn$_V$ of the signature Sign$_V$. Here, the linkbase generation unit 180 may receive a value predetermined in connection with a protocol or the like (from a user or the like) in addition to the second commitment value Y.

If the signatures included in all the received messages are valid, the second user device 100 uses $k_1$=PRF$_K$(1) as an agreed session key.

In an embodiment of the present invention, if a group signature scheme that provides controllable anonymity and linkability is used as a privacy-protecting digital signature scheme, additional link keys may be used to check the linkability of signatures, instead of the linkbases.

Figure 4:
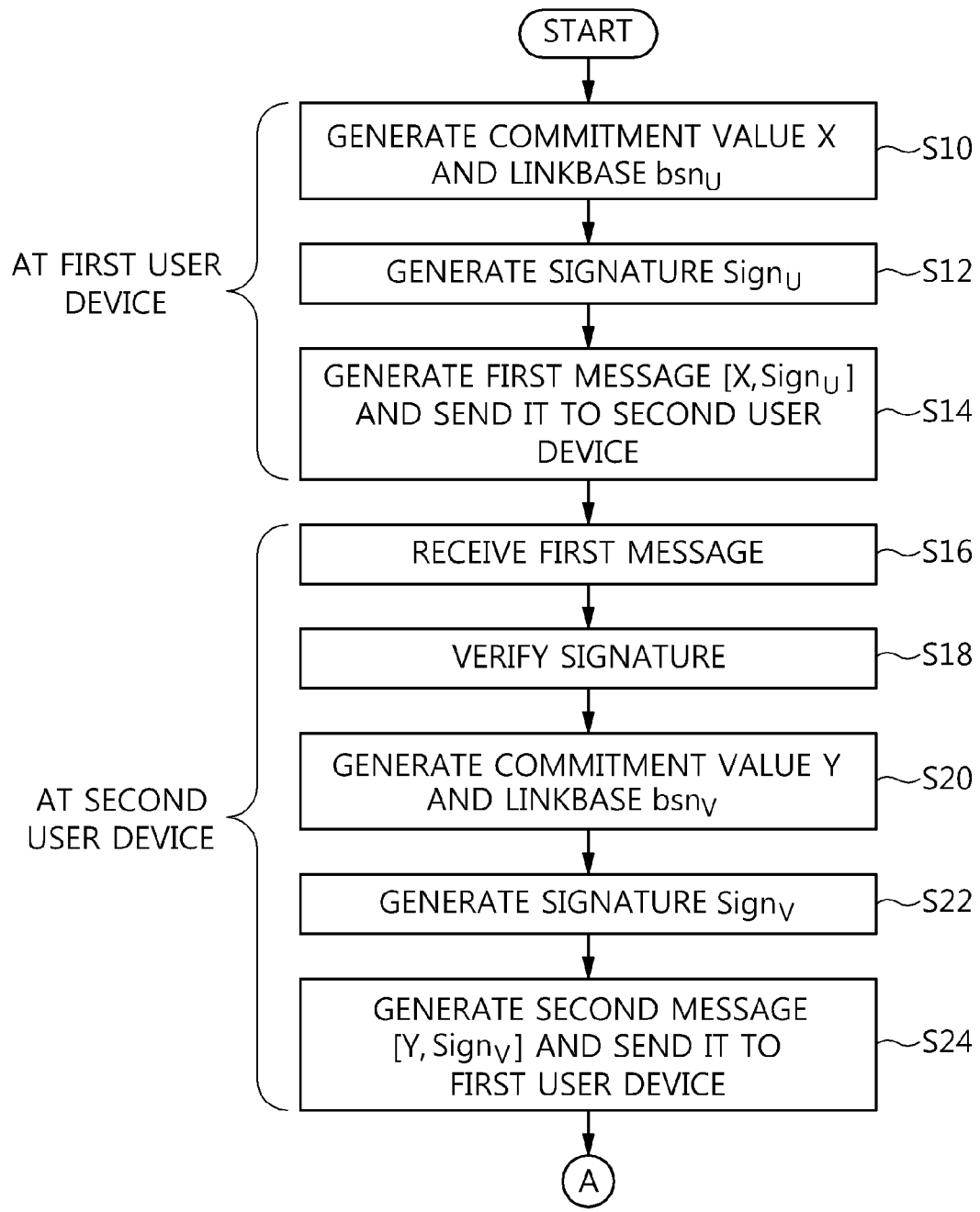
FIGS. 4 and 5 are flowcharts illustrating a method for anonymity-based authentication and key agreement capable of providing a communication message binding property according to an embodiment of the present invention.
Figure 5:
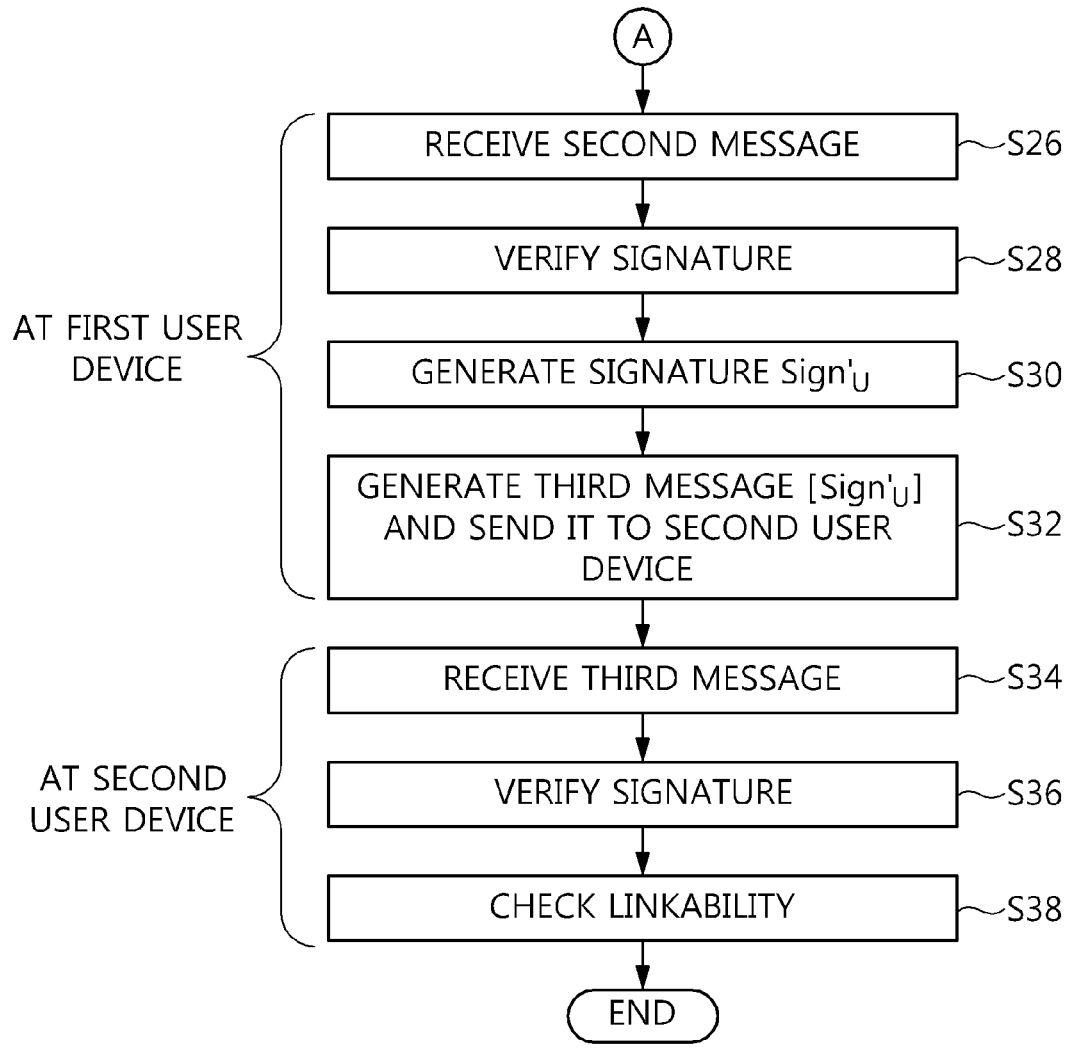

FIGS. 4 and 5 are flowcharts illustrating a method for anonymity-based authentication and key agreement capable of providing a communication message binding property according to an embodiment of the present invention.

First, the first user device 100 selects an arbitrary random number x from Zq, and then computes a first commitment value X=g$^x$. Furthermore, the first user device 100 computes a hash value using the first commitment value X and uses the computed hash value as the linkbase bsn$_U$ of the signature at step S10.

Thereafter, the first user device 100 generates a first signature Sign$_U$=Sign(sk$_U$, gpk, bsn$_U$, X) using its own private key sk$_U$, a group public key gpk, the first commitment value X, and the linkbase bsn$_U$ at step S12. Here, the first signature Sign$_U$ may be considered to correspond to the first signature that is described in claim 4 of the claims of the present application.

Furthermore, the first user device 100 generates a first message [X, Sign$_U$] including the first commitment value X and its first signature Sign$_U$ and sends it to the second user device 200 at step S14.

Thereafter, the second user device 200 receives the first message [X, Sign$_U$] at step S16.

Then the second user device 200 computes a linkbase bsn$_U$ from the received first message [X, Sign$_U$], and determines whether the equality 1=Vrfy(gpk, bsn$_U$, X, Sign$_U$) is satisfied, thereby determining the validity of the first signature at step S18.

If the first signature is valid, the second user device 200 selects an arbitrary random number y from Zq, and then computes a second commitment value Y=g$^y$. Furthermore, the second user device 200 computes a hash value using the second commitment value Y and uses the computed hash value as the linkbase bsn$_V$ of the signature at step S20.

Thereafter, the second user device 200 computes K=X$^y$=g$^{xy}$, $k_0$=PRF$_K$(0), and $k_1$=PRF$_K$(1), computes a hash value $h_V$ ($h_V$=H(Y,X,$k_0$)) and generates a signature Sign$_V$=Sign(sk$_v$, gpk, bsn$_V$, $h_V$) using the hash value $h_V$, its own private key sk$_v$, the group public key gpk, and the linkbase bsn$_V$ at step S22. Here, the signature Sign$_V$ may be considered to correspond to the second signature that is described in claim 4 of the claims of the present application. Furthermore, the hash value $h_V$ may be considered to correspond to the first hash value that is described in claim 4 of the claims of the present application.

Thereafter, the second user device 200 generates a second message [Y, Sign$_V$], including the second commitment value Y and the signature Sign$_V$, and sends it to the first user device 100 at step S24.

Thereafter, the first user device 100 receives the second message [Y, Sign$_V$] from the second user device 200 at step S26.

Furthermore, the first user device 100 verifies the signature included in the second message. That is, the first user device 100 computes a linkbase bsn$_V$ from the received second message [Y, Sign$_V$] and determines whether the equality 1=Vrfy(gpk, bsn$_V$, X, Sign$_V$) is satisfied, thereby determining whether the corresponding signature Sign$_V$ is valid at step S28.

If the signature Sign$_V$ is valid, the first user device 100 computes K=Y$^x$=g$^{xy}$, $k_0$=PRF$_K$(0), and $k_1$=PRF$_K$(1), computes a hash value $h_U$=H(X,Y,$k_0$), and generates a second signature Sign'$_U$ (Sign'$_U$=Sign(sk$_U$, gpk, bsn$_U$, $h_U$) using the computed hash value $h_U$, its own private key sk$_U$, the group public key gpk, and the linkbase bsn$_U$ at step S30. Here, the second signature Sign'$_U$ may be considered to correspond to the third signature that is described in claim 4 of the claims of the present application. Furthermore, the hash value $h_U$ may be considered to correspond to the second hash value that is described in claim 4 of the claims of the present application.

Furthermore, the first user device 100 generates a third message [Sign'$_U$] including its second signature Sign'$_U$ and sends it to the second user device 200 at step S32.

Accordingly, the second user device 200 receives the third message [Sign'$_U$] that is sent by the first user device 100 at step S34.

Furthermore, the second user device 200 computes the linkbase bsn$_U$ of the third message [Sign'$_U$] and the hash value $h_U$ and determines whether the equality 1=Vrfy(gpk, bsn$_U$, $h_U$, Sign'$_U$) is satisfied, thereby determining the validity of the second signature at step S36.

If the second signature is valid, the second user device 200 gathers the first signature of the previously received first message and the second signature combined with the currently received third message, checking the linkability, and determines whether the message senders of these messages are the same. That is, if the first signature of the first message and the second signature of the third message are all valid, the second user device 200 checks the linkability by determining whether the equality 1=Link(Sign$_U$, Sign'$_U$) is satisfied at step S38. In other words, the linkability of the first and second signatures is determined using the linkbases included in the first and second signatures. It will be apparent that it may be possible to use link keys, instead of the linkbases. Accordingly, the linkbases and the link keys are examples of the link information that is set forth in the claims of the present application. If the equality is satisfied, the key is stored, and the key agreement protocol is terminated. Such checking of the linkability may be applied to arbitrary signatures (or signature values) for messages that are exchanged to establish a session regardless of rounds. Accordingly, the user devices 100 and 200 may verify whether counterpart participants are the same by the linkability of the signatures.

Figure 6:
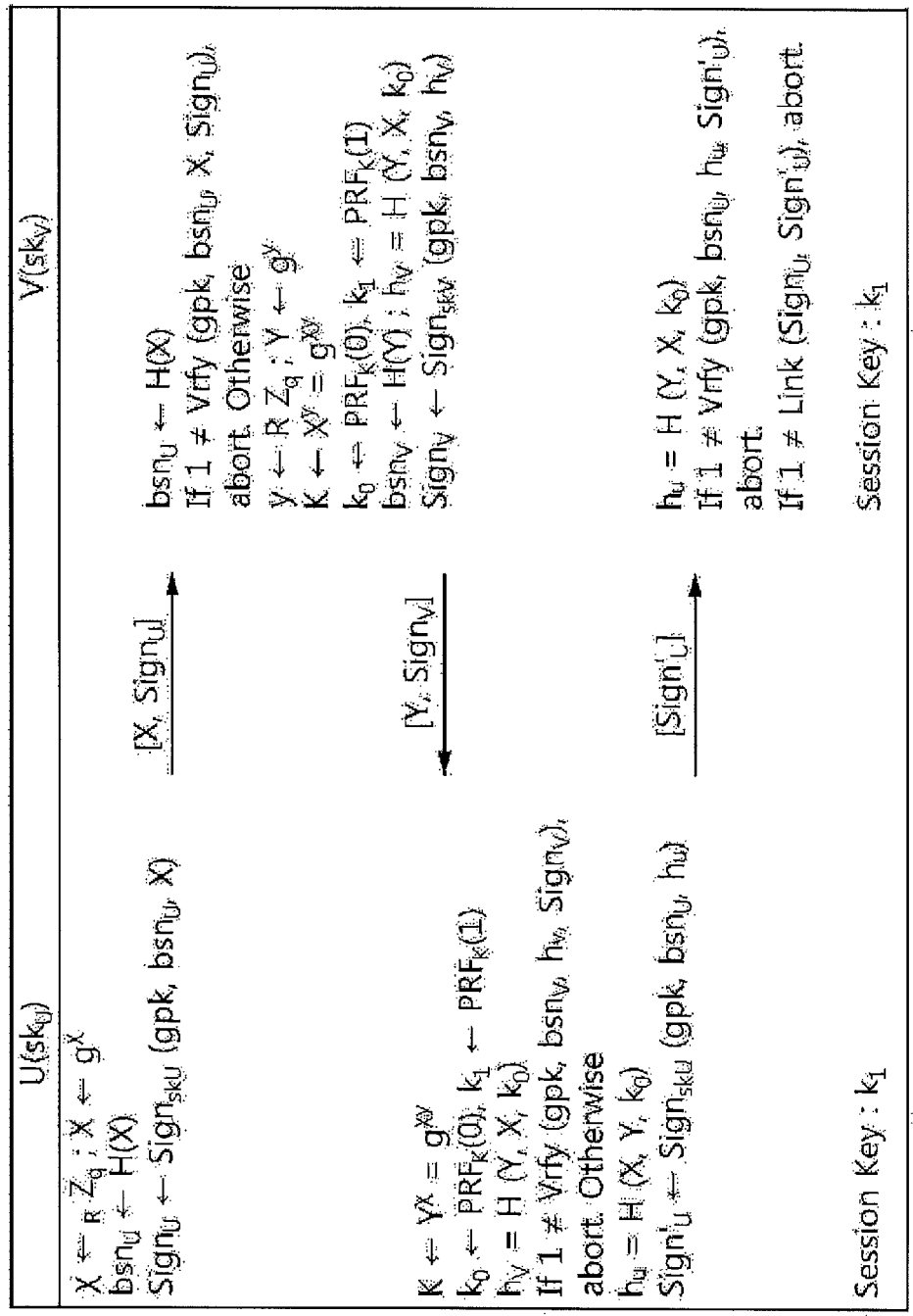
FIG. 6 is a diagram illustrating a key agreement protocol that is applied to the descriptions of the embodiments of the present invention.

FIG. 6 is a diagram illustrating a key agreement protocol that is applied to the descriptions of the embodiments of the present invention. FIG. 6 illustrates the basics of an anonymity-based authenticated key agreement protocol that provides a full binding property. FIG. 6 illustrates a 3-round method based case as an example. If necessary, the above protocol may be operated using a 2-round method through simple modification.

Here, when the illustrated 3-round method is used, it may be possible to send a hash value or a Message Authentication Code (MAC) value using an agreed key with respect to a predetermined message, rather than sending a privacy-protecting digital signature value, in a manner of lessening the full binding property, in order to improve the performance of the above-described key agreement protocol. That is, the first and second user devices 100 and 200 compute a MAC value using an agreed key and then provide authentication to a predetermined message to be sent, rather than adding a signature, which provides linkability, to the specific message. In this case, the linkability depends on an agreed key, so that the binding property is somewhat lessened, but advantages, such as computational efficiency, can be achieved.

Furthermore, during message transmission and reception that is performed after the termination of the 3- or 2-round method based key agreement protocol, the full binding property may be continuously provided using a digital signature that is used for anonymity-based authentication.

In accordance with the present invention configured as described above, the anonymity-based authentication and key agreement protocols that provide a full binding property are employed, and thus session turn-over and session hijacking can be dealt with. Accordingly, a service provider, such as a content provider, can securely set up a session while protecting a service user's privacy and smoothly provide his or her service to the service user. Furthermore, the service user can reliably use a service based on a strong trust in the service provider.

Accordingly, it is expected that the present invention has a great ripple effect on the on-line content consumer market. Furthermore, from a social viewpoint, the illegitimate and irresponsible transmission of content and related criminal acts can be prevented through anonymity-based authentication, and thus the present invention can contribute to the establishment of a healthy content usage culture.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for anonymity-based authentication and key agreement capable of providing a communication message binding property, the method comprising: receiving, by a user device, a plurality of messages, each carrying a signature including link information of a sender; verifying, by the user device, a signature of each of the plurality of messages; determining, by the user device, a common key if the signature of the each of the plurality of messages is verified: and if, as a result of the verification, it is determined that the signature is valid, determining, by the user device, whether the plurality of messages has been sent by an identical sender based on the link information of the signature of each of the plurality of messages; wherein the link information is based on a hash value that is computed by using as an input a commitment value that is obtained by raising a generator of an algebraic multiplicative group, an order of which is a prime number, to a power of a random number.

2. The method of claim 1, wherein the signature is generated by using as input values a private key of the sender, a group public key of the sender, and the link information.

3. The method of claim 1, wherein determining whether the plurality of messages has been sent by the identical sender is performing the determination when the plurality of messages is two or more messages.

4. A method for anonymity-based authentication and key agreement capable of providing a communication message binding property, the method comprising: generating, by a first user device, a first signature based on a private key, group public key, link information, and first commitment value of the first user device, and sending, by the first user device, a first message, including the generated first signature together with the first commitment value, to a second user device; verifying, by the second user device, the first signature, and, if the first signature is valid, sending, by the second user device, a second message, including a second signature generated based on a private key, group public key, link information, and first hash value of the second user device, together with a second commitment value, to the first user device; verifying, by the first user device, the second signature, and, if the second signature is valid, sending, by the first user device, a third message, including a third signature generated based on the private key, group public key, and link information of the first user device and a second hash value of the first user device, to the second user device; determining, by the first user device, a common key if the first signature and the second signature are verified; and verifying, by the second user device, the third signature, and, if the third signature is valid, determining, by the second user device, whether the first and third messages have been sent by the first user device based on the link information of the first and third signatures; wherein the link information of the first user device is based on a hash value that is computed by using as an input the first commitment value that is obtained by raising a generator of a group, an order of which is a prime number, to a power of a first random number.

5. The method of claim 4, wherein the first and second commitment values are each obtained by raising a generator of a group, an order of which is a prime number, to a power of a random number.

6. The method of claim 4, wherein the link information of the second user device is based on a hash value that is computed by using as an input the second commitment value that is obtained by raising a generator of a group, an order of which is a prime number, to a power of a second random number.

7. An apparatus for anonymity-based authentication and key agreement capable of providing a communication message binding property, the apparatus comprising: a signature verification unit configured to receive a plurality of messages, each carrying a signature including link information of a sender, to verify a signature of each of the plurality of messages, and to determine a common key if the signature of the each of the plurality of messages is verified: and a binding checking unit configured to, if it is determined by the signature verification unit that the signature is valid, determine whether the plurality of messages has been sent by an identical sender based on the link information of the signature; wherein the link information is based on a hash value that is computed by using as an input a commitment value that is obtained by raising a generator of an algebraic multiplicative group, an order of which is a prime number, to a power of a random number.

8. The apparatus of claim 7, wherein the signature is generated by using as input values a private key of the sender, a group public key of the sender, and the link information.

9. The apparatus of claim 7, wherein the binding checking unit performs the determination when the plurality of messages is two or more messages.

\* \* \* \* \*